United States Patent
Kwapich

(10) Patent No.: US 12,215,744 B2
(45) Date of Patent: Feb. 4, 2025

(54) AXLE SHAFT DISCONNECT SYSTEM

(71) Applicant: Dana Automotive Systems Group, LLC, Maumee, OH (US)

(72) Inventor: Corey Kwapich, Ottawa Lake, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 9 days.

(21) Appl. No.: 18/337,708

(22) Filed: Jun. 20, 2023

(65) Prior Publication Data

US 2024/0426350 A1 Dec. 26, 2024

(51) Int. Cl.
| | | |
|---|---|---|
| *F16D 19/00* | (2006.01) | |
| *B60B 35/12* | (2006.01) | |
| *B60B 37/04* | (2006.01) | |
| *B60B 37/10* | (2006.01) | |
| *F16D 127/06* | (2012.01) | |

(52) U.S. Cl.
CPC .............. *F16D 19/00* (2013.01); *B60B 35/12* (2013.01); *B60B 37/04* (2013.01); *B60B 37/10* (2013.01); *F16D 2127/06* (2013.01)

(58) Field of Classification Search
CPC ........... F16H 2057/0235; F16H 57/023; F16D 19/00; F16D 2127/06; B60B 35/12; B60B 37/04; B60B 37/10; B60B 2900/3314
See application file for complete search history.

(56) References Cited

U.S. PATENT DOCUMENTS

| | | | |
|---|---|---|---|
| 6,793,034 B2 | 9/2004 | Raftari et al. | |
| 7,708,124 B1 * | 5/2010 | Rackers | B60B 35/16 |
| | | | 188/250 F |
| 8,647,225 B2 | 2/2014 | Thomas et al. | |
| 9,108,511 B2 | 8/2015 | Janson | |
| 9,764,739 B2 | 9/2017 | Deutsch et al. | |
| 9,895,971 B2 | 2/2018 | Kincaid et al. | |
| 10,308,070 B1 * | 6/2019 | Carroll | B60B 27/06 |
| 11,173,782 B2 | 11/2021 | Kumar et al. | |
| 2009/0208278 A1 * | 8/2009 | Cermak | F16D 1/116 |
| | | | 403/375 |
| 2011/0077091 A1 * | 3/2011 | Terada | F16D 3/227 |
| | | | 464/146 |
| 2014/0161509 A1 * | 6/2014 | Choi | F16D 1/10 |
| | | | 403/2 |

(Continued)

FOREIGN PATENT DOCUMENTS

| | | |
|---|---|---|
| CN | 105626855 A | 6/2016 |
| CN | 111204212 A | 5/2020 |

(Continued)

OTHER PUBLICATIONS

Maguire, P. et al., "Battery Cooling System," U.S. Appl. No. 17/809,771, filed Jun. 29, 2022, 36 pages.

*Primary Examiner* — Lori Wu
(74) *Attorney, Agent, or Firm* — McCoy Russell LLP

(57) ABSTRACT

Methods and systems are provided for drivetrain of a vehicle. In one example, the drivetrain includes an axle shaft with a radial nub and a shaft guide surrounding the axle shaft. The shaft guide may have an inner radial groove configured to have an interference fit with the radial nub. When the axle shaft is axially translated along an axial direction to engage the radial nub with the inner radial groove of the shaft guide, the axle shaft may be disconnected from a wheel hub of the vehicle.

20 Claims, 5 Drawing Sheets

(56) References Cited

U.S. PATENT DOCUMENTS

| | | | | |
|---|---|---|---|---|
| 2017/0184203 A1* | 6/2017 | Matczak | ............... | B60B 35/00 |
| 2020/0070575 A1* | 3/2020 | Christ | ................. | B60B 35/02 |
| 2020/0307311 A1* | 10/2020 | Ebert | .................. | B60B 35/16 |
| 2021/0332859 A1* | 10/2021 | Choi | ..................... | F16D 9/06 |

FOREIGN PATENT DOCUMENTS

| | | | | |
|---|---|---|---|---|
| DE | 102004061223 A1 | | 8/2006 | |
| DE | 102008051458 A1 | | 6/2009 | |
| DE | 102022201483 A1 | * | 8/2023 | ............ F16J 15/164 |
| KR | 20230073613 A | * | 5/2023 | ............ B60B 35/12 |

\* cited by examiner

AXLE SHAFT DISCONNECT SYSTEM

TECHNICAL FIELD

The present description relates generally to methods and systems for an axle assembly of a vehicle.

BACKGROUND AND SUMMARY

Electric vehicles may include a drivetrain that couples a motor and gear system to wheels of the vehicle. In some instances, it may be desirable to disconnect axle shafts from the drivetrain to allow the wheels to spin independently of the motor and gear system. For example, during flat or neutral towing of the vehicle, all wheels of the vehicle remain in contact with the ground. As the vehicle is towed, the wheels may spin accordingly which, if engaged with a transmission of the vehicle's powertrain via the axle shafts, may drive rotation of a main shaft of the transmission.

In examples where the vehicle is a hybrid or electric vehicle, rotation at the transmission may be transmitted to at least one electric motor coupled to the transmission. This may lead to overcharging of an electrical storage device of the vehicle which may degrade the electrical storage device as well as other electrical components of the vehicle. Additionally, friction generated during rotation of the electric motor while flat towing may cause the electric motor to overheat. Furthermore, in instances where the vehicle relies on an electric oil pump to lubricate components of the powertrain, the electric oil pump may be deactivated in a tow mode. Without circulation of a lubricant, the powertrain components may be degraded when compelled to rotate.

Attempts to address undesirable rotation at the transmission and electric motor during flat towing include strategies for disengaging the wheels from the powertrain of a vehicle. For example, one or more axle shafts of the vehicle may be disconnected from the transmission. Disconnection of the axle shafts may demand entirely removing the axle shafts from the vehicle since, once disconnected, a position of the axle shafts cannot be maintained as the axle shafts may no longer be mechanically supported. Uninstalling and storing the axle shafts, however, may be cumbersome and inconvenient.

In one example, the issues described above may be addressed by a drivetrain for a vehicle having an axle shaft having a radial nub protruding from an outer surface of the axle shaft and a shaft guide circumferentially surrounding the axle shaft and having an inner radial groove configured to have an interference fit with the radial nub. When the axle shaft is axially translated along an axial direction to engage the radial nub with the inner radial groove of the shaft guide, the axle shaft may be disconnected from a wheel hub of the vehicle. In this way, the vehicle wheels may be disengaged from the powertrain while the axle shafts may remain partially installed and supported during flat towing.

As one example, the shaft guide may be formed of a material that is more flexible and elastic than the axle shaft, allowing the shaft guide to flex and deform. However, the material of the shaft guide may be sufficiently rigid to maintain a position of the axle when disconnected from the wheel hub. The vehicle wheel may spin freely during towing without driving rotation of the axle shaft, thereby precluding rotation of the transmission and an electric motor coupled to the transmission. The wheels may be disengaged from the powertrain without demanding removal and storage of the axle shafts or imposing additional complexity and costly parts to the vehicle drivetrain.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
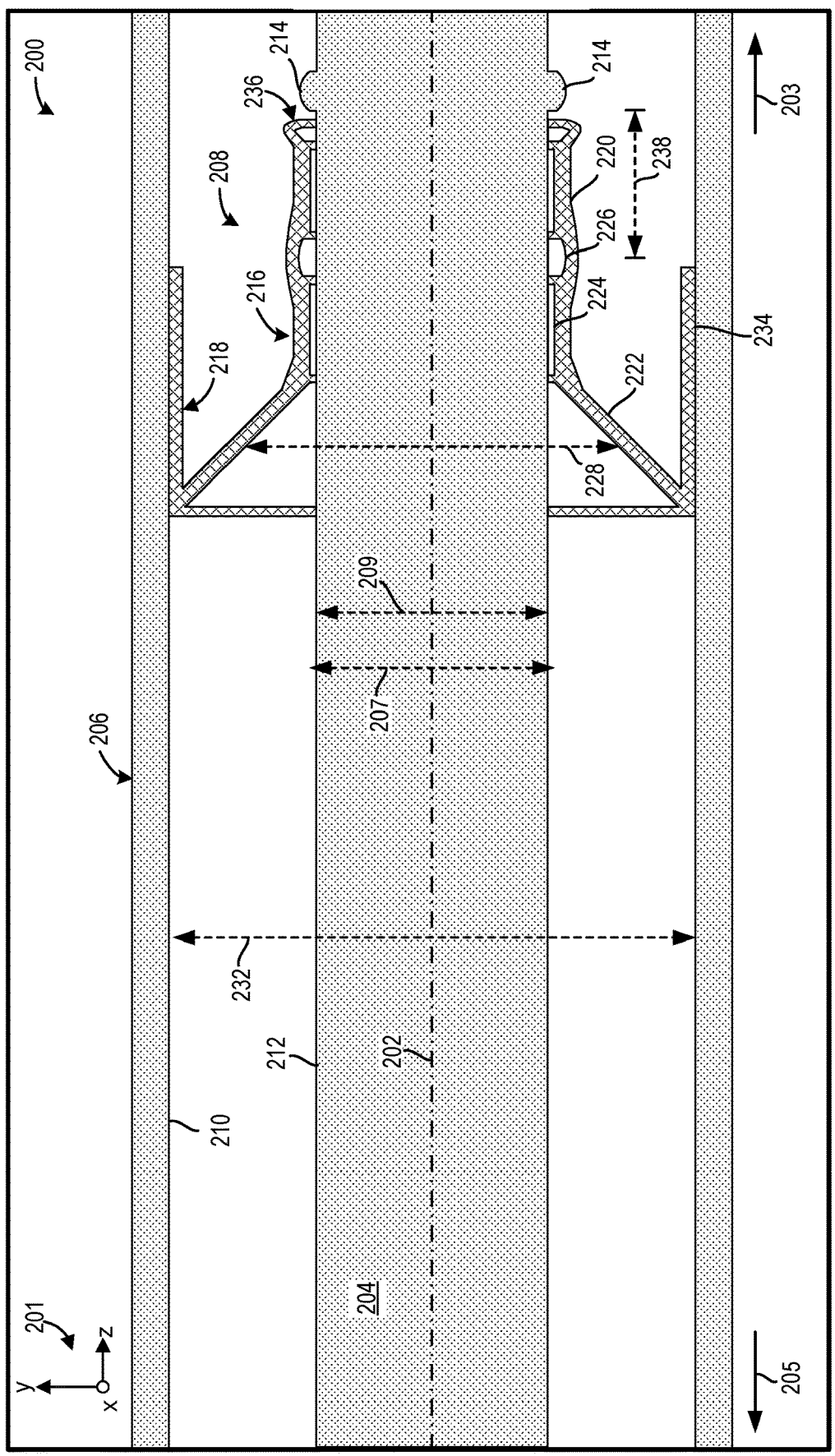
FIG. 2 shows an example of a disengageable axle assembly in a first position.
Figure 3:
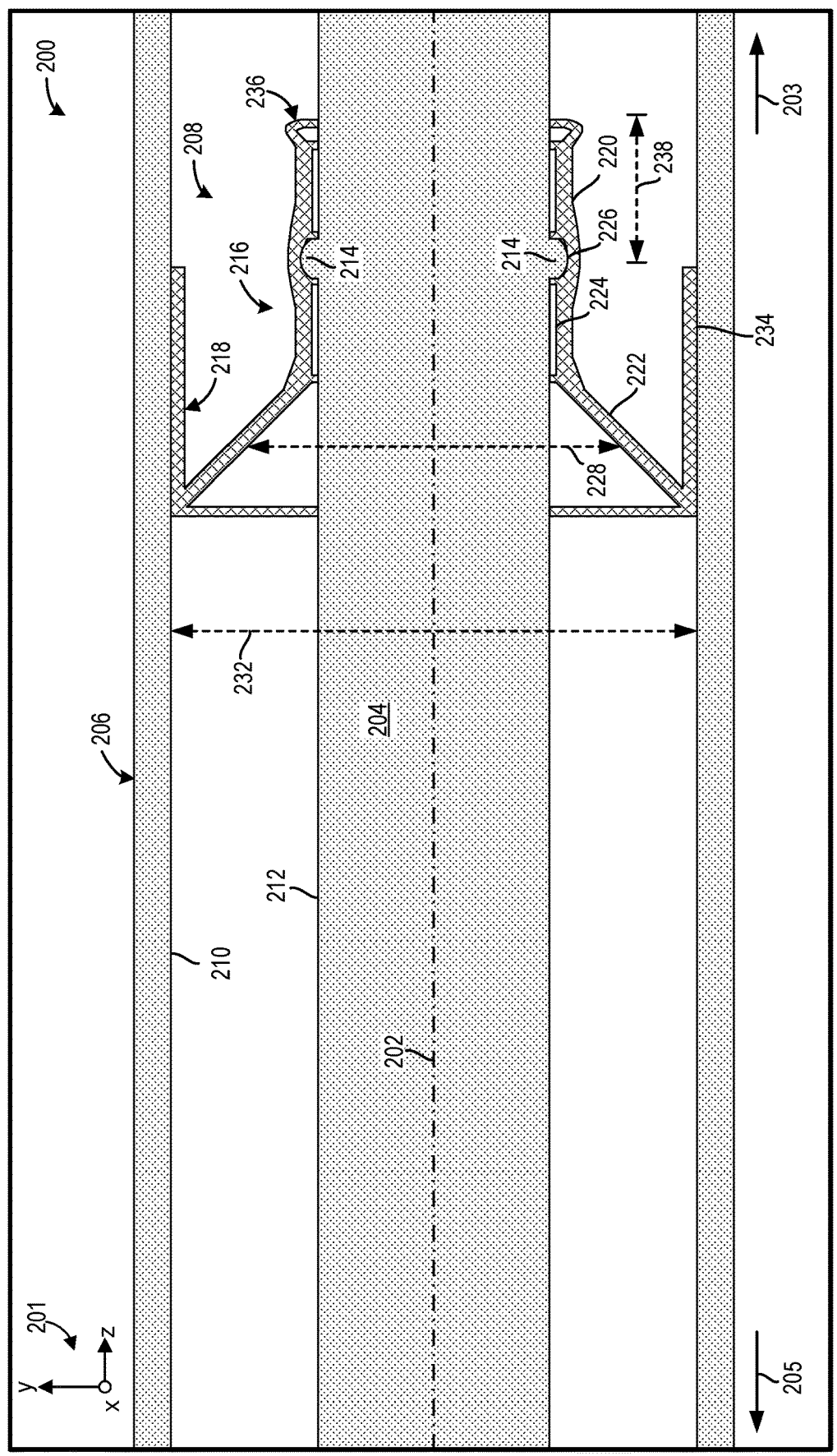
FIG. 3 shows the disengageable axle assembly in a second position.
Figure 4:
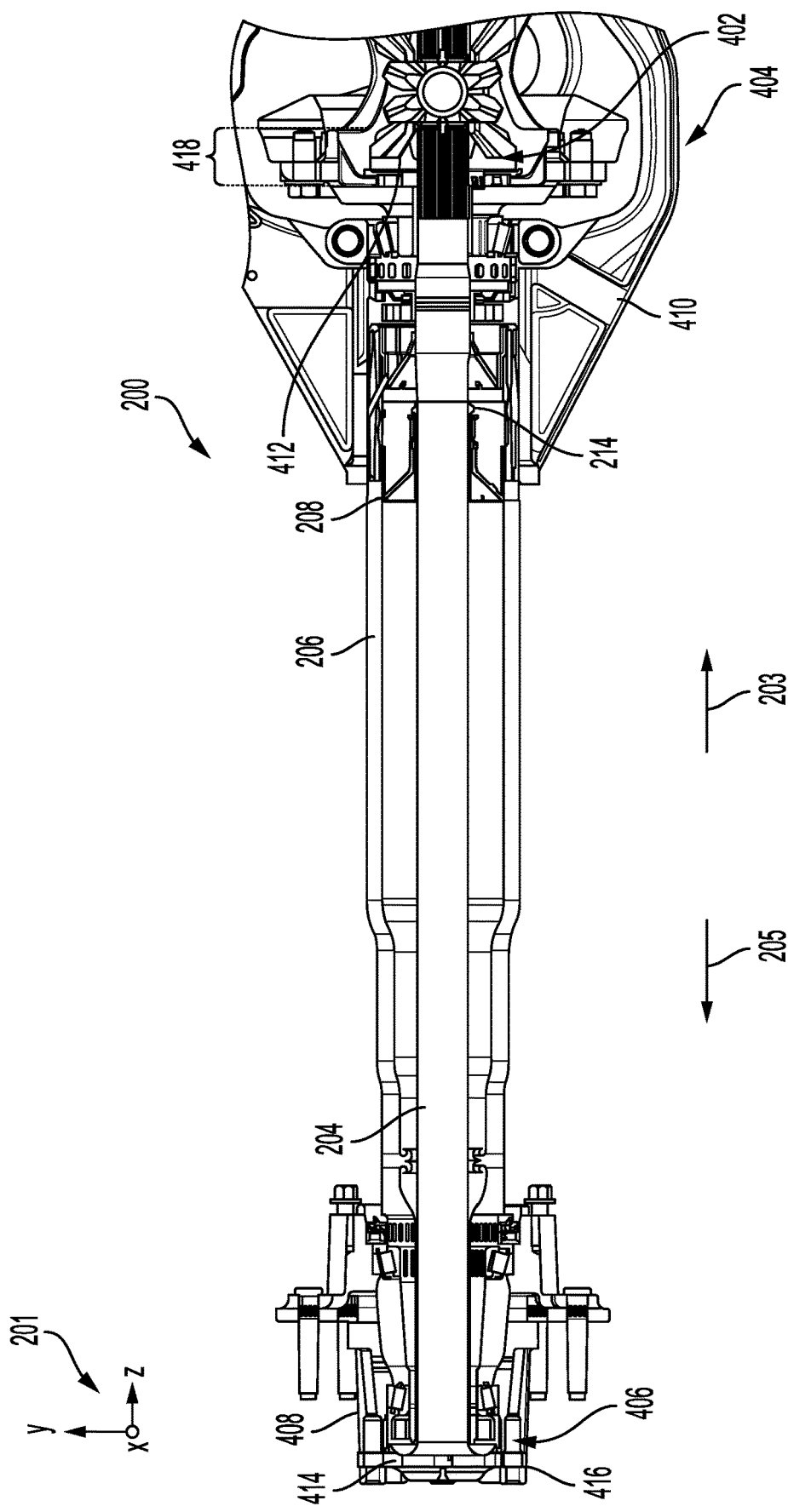
FIG. 4 shows a disengageable axle assembly installed in a vehicle drivetrain.
Figure 5:
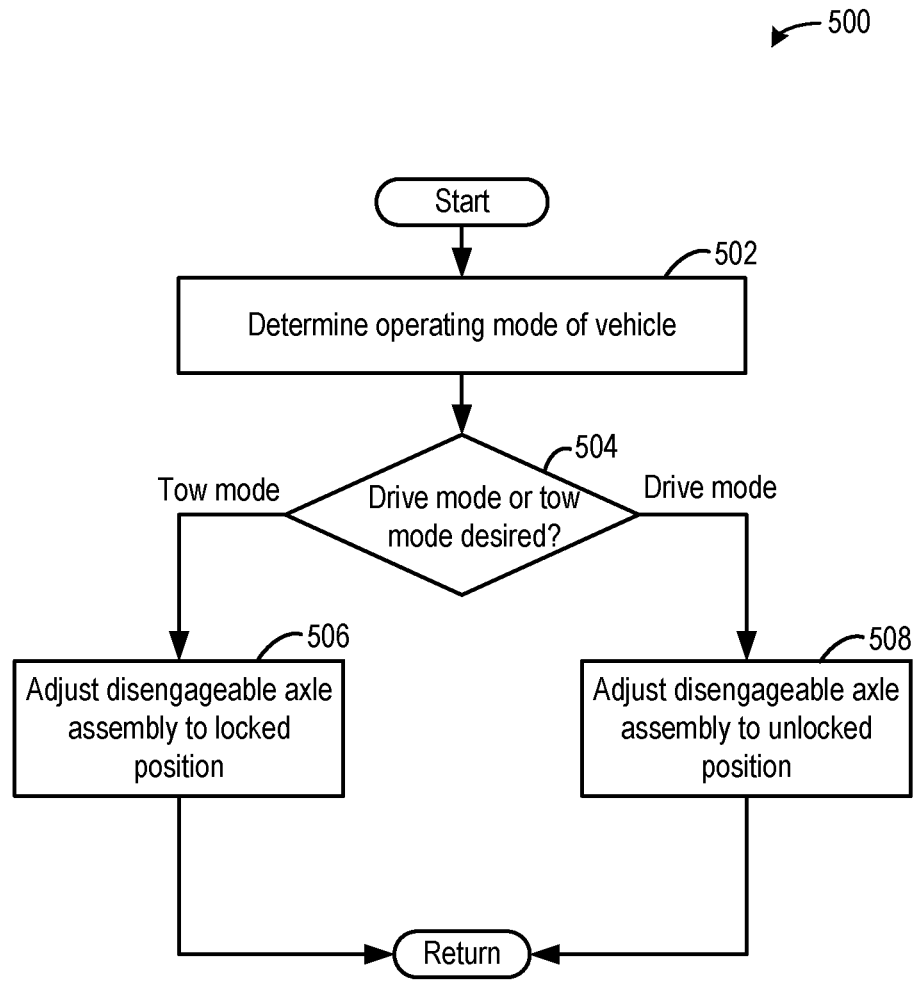
FIG. 5 shows an example of a method for adjusting a disengageable axle assembly according to a desired operating mode of a vehicle.

The following description relates to systems and methods for an axle assembly of a vehicle. The vehicle may include a powertrain, such as a powertrain illustrated in FIG. 1, which may include a prime mover that is powered by an electrical storage device. In some instances, flat towing of the vehicle may be desirable, which may be challenging to accomplish in an electric or hybrid electric vehicle without comprising an integrity of the powertrain and drivetrain components. This may be at least partially addressed by configuring the vehicle with a disengageable axle assembly that allows one or more axle shafts of the vehicle to be disconnected from a corresponding wheel hub. An example of the disengageable axle assembly is depicted in FIGS. 2 and 3 in an unlocked and a locked position, respectively, where the disengageable axle assembly includes a shaft guide that circumferentially surrounds the axle shaft. When disconnected from the wheel hub, the shaft guide may provide mechanical support to the axle shaft and may retain the axle shaft in a desired position while the vehicle is towed. The disengageable axle assembly is further shown coupled to a wheel hub and to a differential in FIG. 4. A method for adjusting the disengageable assembly to between the unlocked and locked positions, corresponding to a drive mode and a tow mode of the vehicle, respectively, is depicted in FIG. 5.

Figure 1:
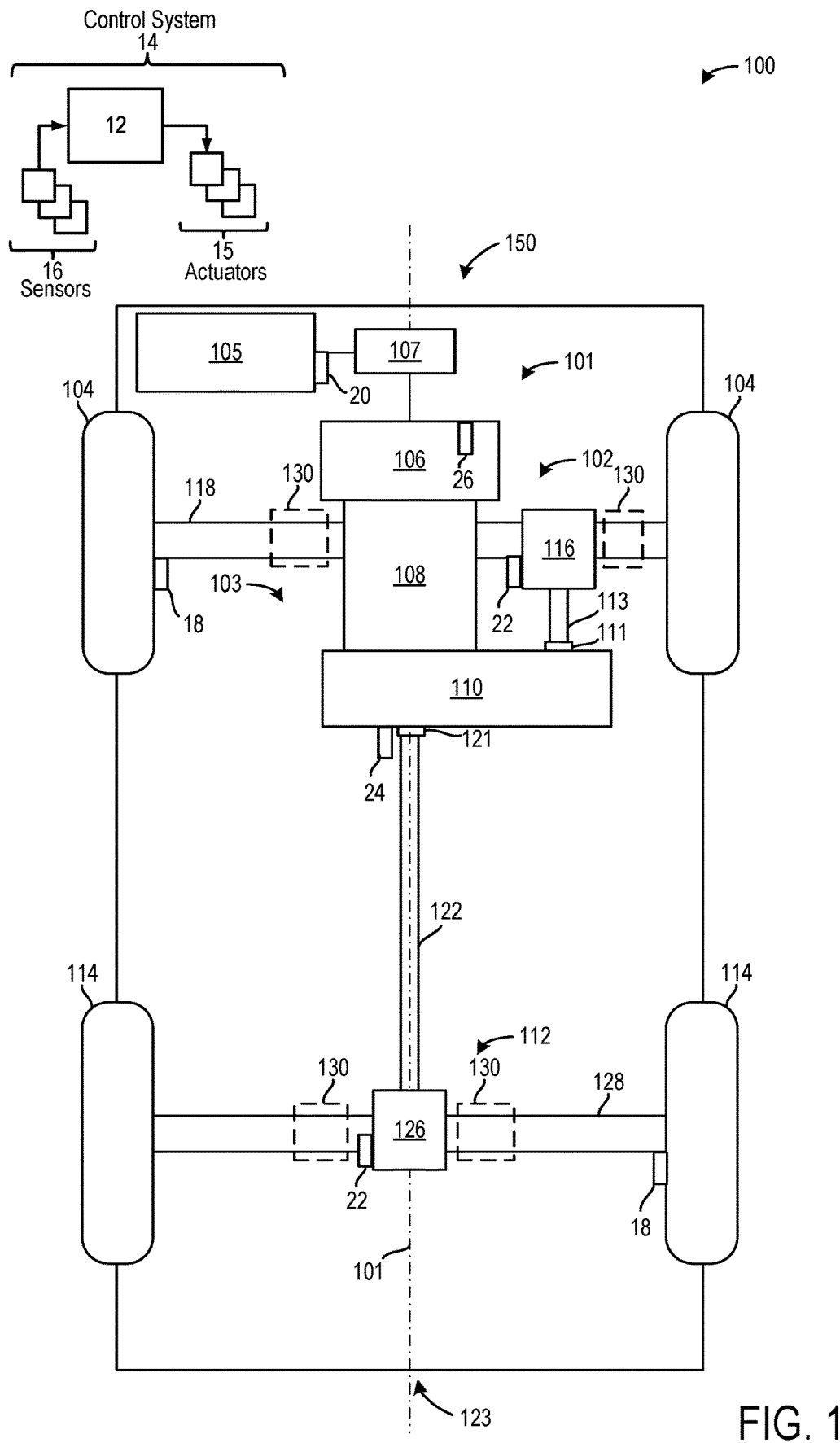
FIG. 1 shows a schematic depiction of an example vehicle powertrain, which may be incorporated in an electric or hybrid electric vehicle having disengageable axle assemblies.

Turning first to FIG. 1, a vehicle 100 is shown having a powertrain 101 and a drivetrain 103. A center line 123, aligned with a longitudinal axis of the vehicle 100, is indicated. The powertrain comprises a prime mover 106 and a transmission 108. The prime mover 106 may be an internal combustion engine and/or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC).

The vehicle 100 may be a commercial vehicle, light, medium, or heavy duty vehicle, a passenger vehicle, an off-highway vehicle, and/or a utility vehicle. Additionally or alternatively, the vehicle 100 and/or one or more of its components may be used in industrial, locomotive, military, agricultural, and aerospace applications. In one example, the vehicle 100 is an electric vehicle.

In some examples, such as shown in FIG. 1, the drivetrain 103 includes a first axle assembly 102 and a second axle assembly 112. At least one or more of the first axle assembly 102 and the second axle assembly 112 may be a disengageable axle assembly where an axle shaft of the respective axle assembly may be disconnected from a respective wheel hub of the vehicle 100. Disconnecting of the axle shaft from the wheel hub may be enabled based on disengagement of a radial nub of the axle shaft from an inner radial groove of a shaft guide that circumferentially surrounds the axle shaft. For example, by translating the axle shaft along an axial direction, e.g., along a central axis of rotation of the axle shaft, the axle shaft may be alternatively connected or disconnected from the wheel hub. Further details of the disengageable axle assembly are provided below, with reference to FIGS. 2-4.

The first axle assembly 102 may be configured to drive a first set of wheels 104, and the second axle assembly 112 may be configured to drive a second set of wheels 114. In one example, the first axle assembly 102 is arranged proximate to a front end 150 of the vehicle 100 and thereby comprises a front axle, and the second axle assembly 112 is arranged proximate to a rear end 152 of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Furthermore, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing, such as an axle tube, as shown in FIG. 2.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

The vehicle 100 may further include a control system 14. The control system 14 is shown receiving information from a plurality of sensors 16 and sending control signals to a plurality of actuators 15. As one example, sensors 16 may include one or more wheel speed sensors 18, a battery sensor 20, differential sensors 22, a vehicle speed sensor 24, and at least one prime mover sensor 26. In one example, the prime mover sensor 26 may be a motor resolver configured to provide position and velocity feedback with respect to the electric motor. Other sensors such as pressure, temperature, air/fuel ratio, and composition sensors when the prime mover 106 includes the engine, may be coupled to various locations in the vehicle 100. The plurality of actuators may include the electric motor, transmission, etc. The control system 14 may include a controller 12 which may receive input data from the various sensors, process the input data, and trigger the plurality of actuators 15 in response to the processed input data, based on instruction or code programmed therein, corresponding to one or more routines. In particular, the controller 12 may be a microcomputer, including microprocessor units, input/output ports, an electronic storage medium for executable programs and calibration values such as a read only memory chip, random access memory, keep alive memory, and a data bus.

As shown in FIG. 1, a vehicle, when configured as a hybrid or electric vehicle, may include at least one electric motor coupled to a drivetrain of the vehicle. In one example, the electric motor may be fixedly coupled to the drivetrain such that rotation of the electric motor drives rotation of the drivetrain. Conversely, rotation of the drivetrain may compel rotation of the electric motor. In some examples, adjustment of a transmission of the vehicle to a neutral mode where rotation of the vehicle wheels and rotation of the transmission are independent of one another may not be available. For example, one or more axle shafts may be coupled to the vehicles wheels and the transmission or a differential in a manner where the axle shafts cannot be disengaged from the wheels and the transmission or differential. As another example, the vehicle may be disabled such that an operator is unable to adjust the transmission, e.g., via a gearbox, into the neutral mode.

In some instances, towing of the vehicle may be demanded or desired. For examples where adjustment of the transmission to the neutral mode is not possible, as described above, towing of the vehicle with all vehicle wheels remaining in contact with the ground, e.g., flat towing, may be precluded. Instead, towing of the vehicle where the vehicle's wheels are off the ground may be demanded in order to preserve an integrity of the vehicle's powertrain. As another option, axle shafts of the vehicle may be disconnected and removed in order to decouple the vehicle's wheel hubs from the powertrain, which may enable flat towing of the vehicle. Removal, storage, and transport of the axle shafts while the vehicle is towed, however, may be inconvenient and laborious.

As an alternative to the approaches described above, the vehicle may instead have at least one disengageable axle assembly. The disengageable axle assembly may include at least one axially translatable (e.g., slidable) axle shaft that is supported by a shaft guide. The shaft guide may be positioned along an axle shaft, as indicated by dashed regions 130 in FIG. 1. For example, the shaft guide may be coupled to at least one axle shaft of the first set of axle shafts 118 or to at least one axle shaft of the second set of axle shafts 128. In some examples, the shaft guide may be coupled to each axle shaft of the vehicle. Further, a position of the shaft guide along the respective axle shaft may vary from that indicated by the dashed regions 130 in FIG. 1 without departing from the scope of the present disclosure. In some instances, positioning of the shaft guide as close as possible to a transmission or differential end of the axle shaft may be desirable to provide maximum support to the axle shaft when disengaged from a respective wheel hub.

Axial translation of the axle shaft into an unlocked configuration relative to the shaft guide may maintain the axle shaft connected to a wheel hub, which may be suitable for when the vehicle is being driven, e.g., in a drive mode. When the axle shaft is axially translated into a locked configuration relative to the shaft guide, a flange at an end of the axle shaft may be shifted away from the wheel hub, allowing a clearance gap to be present between an end of the axle shaft and the wheel hub. In the locked configuration, the wheel hub may rotate without causing rotation of the powertrain. As such, the vehicle may be readily adjusted between a drive mode of the drivetrain, in which the unlocked configuration of the disengageable axle assembly is implemented, and a tow mode of the drivetrain, in which the locked configuration of the disengageable axle assembly is implemented.

An example of a disengageable axle assembly 200 of a vehicle, such as the vehicle 100 of FIG. 1, is depicted in a partial cross-sectional view in FIGS. 2 and 3. The disengageable axle assembly 200 is illustrated in a first, unlocked configuration in FIG. 2, and in a second, locked configuration in FIG. 3. A set of reference axes 201 is provided, indicating an x-axis, a y-axis, and a z-axis. In one example, the y-axis is parallel with a direction of gravity, and the z-axis is parallel with a central axis of rotation 202 of the disengageable axle assembly 200. Further, a first axial direction, e.g., an inboard direction 203, and a second axial direction, e.g., an outboard direction 205 is indicated in FIG. 2. The inboard direction 203 may be a direction towards a center line (e.g., the center line 123 of FIG. 1) of a vehicle and the outboard direction 205 may be a direction away from the center line of the vehicle.

The disengageable axle assembly 200 includes an axle shaft 204, an axle tube 206 enclosing the axle shaft 204, and a shaft guide 208. In one example the axle tube 206 may be a differential tube that extends from a differential housing. In another example, the axle tube 206 may be a tube extending from a transmission casing. The axle tube 206 may be fixedly coupled to the respective housing and does not rotate.

The axle shaft 204 may be included in one or more of the first and second sets of axle shafts 118 and 128 of FIG. 1 (e.g., the axle shaft 204 is a non-limiting example of one or more of the axle shafts of the first set of axle shafts 118 and the second set of axle shafts 128). The axle tube 206 may be a sleeve that circumferentially and concentrically surrounds the axle shaft 204 but is spaced away from the axle shaft 204. For example, an inner surface 210 of the axle tube 206 may not be in contact in an outer surface 212 of the axle shaft 204. As described above, the axle tube 206 may be fixedly coupled to a housing of a drivetrain or powertrain component and may remain stationary. When the axle shaft 204 rotates, the axle shaft 204 may rotate within the axle tube 206.

The outer surface 212 of the axle shaft 204 may include a radial nub 214 protruding outwards, away from the central axis of rotation 202 of the disengageable axle assembly 200. In one example, the radial nub 214 may be integrated into a structure of the axle shaft. For example, during manufacturing, the axle shaft 204 may be formed with the radial nub 214. In other examples, the radial nub may be fixedly coupled to the outer surface 212 of the axle shaft 204, such as via a press-fit connection or via welding. The radial nub 214 may extend around an entire circumference of the axle shaft 204 or may extend around only a portion of the circumference of the axle shaft 204.

The axle shaft 204 may extend between a drive train component and a wheel hub of a vehicle. For example, the axle shaft 204 may be coupled at a first end (e.g., along the inboard direction 203) to a transmission or a differential and at a second, opposite end (e.g., along the outboard direction 205) to the wheel hub. The first end may include a spline and the second end may include a flange, as shown in FIG. 4 and described further below.

The shaft guide 208 may be arranged between the axle shaft 204 and the axle tube 206 and may be enclosed by the axle tube 206. In one example, the shaft guide 208 may be positioned as indicated by dashed regions 130 of FIG. 1, as described previously. The shaft guide 208 may be a modified version of a device used to guide installation of the axle shaft 204 into the axle tube 206. For example, the shaft guide 208 may include an inner radial groove 226 for receiving the radial nub 214 of the axle shaft 204.

The shaft guide 208 may be in contact with each of the axle shaft 204 and the axle tube 206 such that the outer surface 212 of the axle shaft 204 is spaced away from the inner surface 210 of the axle tube 206 by the shaft guide 208. For example, the shaft guide 208 may have a first, flared portion 216 that surrounds the axle shaft 204, and a second, cylindrical portion 218 that is in contact with the axle tube 206. The flared portion 216 may be continuous with the cylindrical portion 218, forming a single, continuous unit.

The flared portion 216 may include a sleeve 220 and a cone 222. The sleeve 220 may extend along a portion of a length of the axle shaft, the length defined along the z-axis, and an inner surface 224 of the sleeve 220 may include the inner radial groove 226. The inner radial groove 226 may extend around a circumference of the shaft guide 208, or at least a portion thereof, and be shaped to match a geometry of the radial nub 214 of the axle shaft 204. In other words, the inner radial groove 226 may be configured to receive the radial nub 214 and mate with the radial nub 214 such that the inner radial groove 226 and the radial nub 214 have an interference fit that inhibits movement of the axle shaft 204 in any direction.

As shown in FIG. 2, an inner diameter 207 of the sleeve 220 may be greater than a diameter 209 of the axle shaft 204.

The outer surface 212 of the axle shaft 204 may not be in contact with the inner surface 224 of the sleeve 220. Instead, the inner surface 224 of the sleeve 220 may be spaced away from the outer surface 212 of the axle shaft 204 and concentric with the axle tube 206 regardless of whether the disengageable axle assembly 200 is in the locked or unlocked position. When the disengageable axle assembly 200 is in the unlocked position (e.g., as shown in FIG. 2), concentric alignment of the axle shaft 204 with the axle tube 206 may be maintained by coupling of the first end of the axle shaft 204 to the drivetrain or powertrain component and coupling of the second end of the axle shaft 204 to the wheel hub (as shown in FIG. 4). When the disengageable axle assembly 200 is in the locked position (e.g., as shown in FIG. 3), the concentric alignment of the axle shaft 204 with the axle tube 206 may be supported by the wheel hub and by the interference fit of the radial nub 214 of the axle shaft 204 with the inner radial groove 226 of the shaft guide 208.

The cone 222 of the shaft guide 208 may extend from an end of the sleeve 220 to an end of the cylindrical portion 218 at an angle relative to the central axis of rotation 202. For example, the angle of the cone 222 may be 45 degrees relative to the central axis of rotation 202. In other examples, the angle may be within a range of 30-60 degrees. A diameter 228 of the cone 222 may increase from the end of the sleeve 220 to the end of the cylindrical portion 218. The cone 222 may be a hollow structure and may be open at a widest end of the cone 222. In other examples, the cone 222 includes an end wall having a central opening through which the axle shaft 204 may extend.

The cylindrical portion 218 of the shaft guide 208 may extend parallel with the z-axis away from the widest end of the cone 222, along the inboard direction 203. The cylindrical portion 218 may have an outer diameter 232 that is equal to an inner diameter of the axle tube 206, which may also provide an interference fit, in some examples. For example, the cylindrical portion 218 may include an outer face 234 that is in face-sharing contact with the inner surface 210 of the axle tube 206. As shown in FIGS. 2 and 3, the cylindrical portion 218 of the shaft guide 208 may have a length, as defined along the z-axis, that is less than a length of the flared portion 216 and greater than a length of the cone 222. In other examples, the length of the cylindrical portion 218 of the shaft guide 208 may vary from the length depicted in FIGS. 2 and 3. For example, the cylindrical portion 218 may be shorter or longer than shown, and/or may be longer than the flared portion 216.

The shaft guide 208 may be formed of a material that flexes enough to allow the inner diameter 207 of the sleeve 220 to expand when the axle shaft 204 translates axially (e.g., along the z-axis) such that the radial nub 214 may slide inside of the shaft guide 208 and press outward against the inner surface 224 of the sleeve 220 when a force is applied to compel the axial translation. For example, the shaft guide 208 may be formed of a plastic or rubber. In one example, the shaft guide 208 may be a continuous, single structure that is composed entirely of a common material. In another example, the flared portion 216 may be formed of a different material than the cylindrical portion 218, and the portions may be fixedly coupled via welding, as an example. When formed of different materials, the cylindrical portion 218 may be formed of a more rigid material than the flared portion 216. Furthermore, in some examples, the outer face 234 of the cylindrical portion 218 may be textured to increase friction between the outer face 234 of the cylindrical portion 218 and the inner surface 210 of the axle tube 206.

The disengageable axle assembly 200 is configured to allow the axle shaft 204 to be adjusted between the unlocked position, as shown in FIG. 2, during operation of the vehicle in a drive mode, and the locked position, as shown in FIG. 3, during operation of the vehicle in a tow mode, in one example. In the unlocked position, the axle shaft 204 is shifted along the inboard direction 203, relative to the locked position of FIG. 3. For example, the axle shaft 204 may be axially translated along the inboard direction 203 until the radial nub 214 of the axle shaft 204 is positioned past and inboard of the shaft guide 208. When the radial nub 214 is inboard of the shaft guide 208, the radial nub 214 no longer abuts the inner surface 224 of the sleeve of the shaft guide 208. In other words, the radial nub 214 is outside of the shaft guide 208, when the disengageable axle assembly 200 is in the unlocked position, and located between the shaft guide 208 and the powertrain component to which the axle shaft 204 is coupled.

Further, in the unlocked position of the disengageable axle assembly 200, the axle shaft 204 is shifted far enough in the inboard direction 203, such as when the radial nub 214 is inboard of an inboard end 236 of the shaft guide 208, that the flange at the second end of the axle shaft 204 (which engages the wheel hub) abuts the wheel hub.

For example, the disengageable axle assembly 200 is depicted in FIG. 4, installed in a drivetrain of a vehicle and in the unlocked position corresponding to FIG. 2. The axle shaft 204 has an inboard end 402 coupled to a differential 404 and an outboard end 406 coupled to a wheel hub 408. The axle tube 206 is fixedly coupled to a housing 410 of the differential 404 and to the wheel hub 408. The radial nub 214 of the axle shaft 204 is positioned inboard of the shaft guide 208.

At the inboard end 402 of the axle shaft 204, the axle shaft 204 has a plurality of splines configured to mate with a side gear 412 of the differential 404. While the plurality of splines may interlock with the side gear 412 when the disengageable axle assembly 200 is in the unlocked position, the interfacing of the plurality of splines with the side gear 412 is not fixed. For example, the axle shaft 204 may slide away from the differential 404 along the outboard direction 205 to decouple the plurality of splines from the side gear 412 without demanding manipulation of fastening devices at the inboard end 402 of the axle shaft 204 or at the differential 404.

At the outboard end 406 of axle shaft 204, the axle shaft has a flange 414 with openings for receiving fastening devices, such as bolts. The flange 414 may protrude outside of the wheel hub 408 such that an inner (e.g., inboard) surface of the flange 414 abuts the wheel hub when the disengageable axle assembly 200 is in the unlocked position and the plurality of splines of the inboard end 402 of the axle shaft 204 is engaged with the side gear 412. The positioning of the flange 414 relative to the wheel hub 408 thereby inhibits further inboard translation of the axle shaft 204 beyond the unlocked position.

When the disengageable axle assembly 200 is in the unlocked position as shown in FIG. 4, the flange 414 may be in contact with the wheel hub 408 and the openings of the flange 414 may be aligned with bolted joints 416 of the wheel hub 408. The flange 414 may be bolted to the wheel hub 408 by fastening bolts at the bolted joints 416, securing the axle shaft 204 to the wheel hub 408. Sliding of the axle shaft 204 along the axial direction is thereby inhibited. Rotation of the axle shaft 204, as compelled by the differential 404, may be transferred to the wheel hub 408. Further, the axle shaft 204 may not be in contact with the shaft guide 208 as the axle shaft 204 rotates.

When the disengageable axle assembly 200 is in the locked position shown in FIG. 3, the axle shaft 204 is translated along the outboard direction 205 relative to the unlocked position shown in FIG. 2. The axle shaft 204 may be shifted axially, e.g., along the central axis of rotation 202, forcing the sleeve 220 of the shaft guide 208 to flex and increase in inner diameter to accommodate an increased diameter of the axle shaft 204 at the radial nub 214, as the radial nub 214 is pulled through a distance 238 along the shaft guide 208, between the inboard end 236 of the shaft guide 208 and the inner radial groove 226 of the shaft guide 208. Axial translation of the axle shaft 204 into the locked position may be terminated when the radial nub 214 is inserted into the inner radial groove 226 of the shaft guide 208. Expansion of the inner diameter of the sleeve 220 of the shaft guide 208 may cease when the radial nub 214 is located inside of the inner radial groove 226, allowing the material of the sleeve 220 of the shaft guide 208 to relax.

The rigidity of the material of the flared portion 216 of the shaft guide 208 may inhibit further axial translation, e.g., in either the inboard or outboard directions 203, 205, that positions the radial nub 214 out of the inner radial groove 226. The axle shaft 204 may be further axially translated only when enough force is applied along the z-axis to overcome the rigidity of the flared portion 216 of the shaft guide 208 and push or pull the radial nub 214 out of the inner radial groove 226. In other words, the applied force may be at least large enough to compel the sleeve 220 of the shaft guide 208 to flex and expand in diameter due to abutting of the radial nub 214 against the inner surface 224 of shaft guide 208.

When the radial nub 214 is in the inner radial groove 226, the flange at the second end of the axle shaft 204 may be spaced away from the wheel hub by a clearance gap. In one example, the clearance gap may be at least a distance at which the flange of the axle shaft 204 is no longer in contact with the wheel hub. In another example, as indicated in FIG. 4, the clearance gap may correspond to a distance 418 that the axle shaft 204 is translated along the outboard direction 205, away from the differential 404 to disengage the plurality of splines at the inboard end 402 of the axle shaft 204 from the side gear 412 of the differential 404. Prior to adjusting the disengageable axle assembly 200 to the locked position, the bolts may be removed from the bolted joints 416 of the wheel hub 408. The shaft guide 208 may therefore be positioned along the axle tube 206 such that when the disengageable axle assembly 200 is adjusted to the locked position, the axle shaft 204 is shifted along the outboard direction 205 by at least the distance 418, relative to the unlocked position. As described above, in the locked position, the radial nub 214 of the axle shaft 204 may be inserted into the inner radial groove 226 of the shaft guide 208 and a position of the axle shaft 204 may be locked in place by the interference fit between the radial nub 214 and the inner radial groove 226.

When the axle shaft 204 is shifted by the distance 418 to disengage the axle shaft 204 from the side gear 412 of the differential 404, the flange 414 at the outboard end 406 of the axle shaft 204 is concomitantly shifted away from the wheel hub 408 along the outboard direction 205. The flange 414 of the axle shaft 204 is thereby cleared from the wheel hub 408, allowing the wheel hub to spin freely without driving rotation of the axle shaft 204.

Thus, when the vehicle is towed with all wheels remaining in contact with the ground, the disengageable axle assembly 200 may be adjusted to the locked position to disconnect the wheel hub 408 from the axle shaft 204. A corresponding wheel of the vehicle may rotate freely as the vehicle is towed without compelling rotation of the axle shaft. The vehicle powertrain is therefore disengaged from the wheel and does not rotate with the wheel.

Although the axle shaft 204 is disconnected from the wheel hub 408 at the outboard end 406, the position of the axle shaft 204 with respect to the vehicle may be maintained by the shaft guide 208. For example, as described above, an alignment of the axle shaft 204 with the wheel hub 408 and the drivetrain or powertrain component (e.g., the side gear 412 of the differential 404) along the z-axis may remain unchanged, even when the axle shaft 204 is spaced away from the wheel hub 408. The shaft guide 208 may operate as a brace for holding the axle shaft 204 in place when the inboard end 402 of the axle shaft 204 is not supported by connection to the drivetrain or powertrain component.

Further, the interference fit between the radial nub 214 of the axle shaft and the inner radial groove 226 of the shaft guide may mitigate further axial translation of the axle shaft 204 or undesired motion of the axle shaft 204. For example, the rigidity of the material of the shaft guide 208 may minimize bouncing of the axle shaft, e.g., in directions orthogonal to the central axis of rotation 202, and circumvent impingement of the axle shaft 204 on the axle tube 206 while the vehicle is towed. As a result, removal or other manipulation of the axle shaft 204 is not demanded when flat towing of the vehicle is desired. Instead, the axle shaft 204 may remain partially installed (e.g., remaining within the axle tube 206), without transmitting rotation of the wheel to vehicle's powertrain. In addition, alignment of the axle shaft 204 with the wheel hub 408 may be maintained while the axle shaft 204 is disconnected therefrom, allowing the axle shaft 204 to be readily reconnected to the wheel hub 408 (and the drivetrain/powertrain component) when operation of the vehicle in the drive mode is desired.

An example of a method 500 is shown in FIG. 5 for adjusting a drivetrain of a vehicle between a tow mode and a drive mode. The vehicle may, in one example, be the vehicle 100 of FIG. 1, and may have a disengageable axle assembly, such as the disengageable axle assembly 200 of FIGS. 2-4 coupled to at least one axle shaft of the vehicle. As an example, the vehicle may have a transmission that does not include a neutral mode where the power train is disconnected from the vehicle wheels. Alternatively, the vehicle may be disabled such that adjustment to the neutral mode at, for example, a gearbox of the transmission is unavailable. The method may be executed by an operator, such as a driver or a tow-truck operator, and at least some of the steps of the method may be carried out with assistance from data outputted by sensors of the vehicle, such as the sensors described with reference to FIG. 1.

At 502, the method includes determining an operating mode of the drivetrain of the vehicle. For example, the drivetrain may be in a tow mode when one or more axle shafts of the vehicle are disengaged from corresponding wheel hubs of the vehicle (e.g., the corresponding disengageable axle assemblies are in an unlocked position). The axle shafts may also be disengaged from a powertrain component, such as a differential or a transmission when the drivetrain is in the tow mode. The drivetrain may be in a drive mode when the one or more axle shafts are each connected to a respective wheel hub and to the corresponding drivetrain or powertrain components.

In one example, the operating mode of the vehicle may be determined based on signals from one or more sensors of the vehicle. For example, when at least one wheel is disconnected and a control system, e.g., the control system 14 of FIG. 1, is active, data received from wheel speed sensors, such as the wheel speed sensors 18 of FIG. 1, may indicate that a respective wheel is disconnected. For example, a notification that no signal is detected from one or more of the wheel speed sensors may be presented to an operator, which may result from a detector of the wheel speed sensor being out of range of a signal generating device of the wheel speed sensor. As another example, the operating mode of the vehicle may be determined based on a signal from a motor resolver coupled to an electric motor of the vehicle, such as the motor resolver 26 of FIG. 1, and comparison of the signal to an output from another sensor. For example, the signal from the motor resolver may be compared to an output from a differential sensor, such as the differential sensors 22 of FIG. 1. If the signal from the motor resolver indicates that motion at the electric motor is not correlated to motion detected at the differential sensor, a notification may be presented to the operator, indicating disconnection between the powertrain and the drivetrain of the vehicle.

Additionally or alternatively, the operating mode of the drivetrain may be determined by the operator based on visual inspection. For example, observation that fasteners coupling an axle shaft to a wheel hub have been removed or that a flange at an outboard end of the axle shaft is spaced away from the wheel hub may indicate that the drivetrain is in the tow mode. Conversely, when all axles of the vehicle are coupled to the wheel hubs with the fasteners in place, engagement of the axles shafts with the wheel hubs and the respective powertrain/drivetrain component may be indicated. The drivetrain may therefore in in the drive mode.

At 504, the method includes confirming if the drive mode or the tow mode of the drivetrain is desired. For example, the drive mode may be desired when the operator wishes to drive the vehicle. As another example, the tow mode may be desired when the vehicle is to be towed, such as via flat-towing. If operation of the vehicle drivetrain in the tow mode is desired, the method proceeds to 506, where at least one disengageable axle assembly is adjusted to a locked position, such as the locked position depicted in FIG. 3. For example, the operator may remove the fasteners (e.g., bolts) securing one of the axle shafts of the disengageable axle assembly to the respective wheel hub and may pull the axle shaft in an outboard direction until a radial nub of the axle shaft is inserted into an inner radial groove of a shaft guide of the disengageable axle assembly. As an example, the operators may grip an outboard end of the axle shaft, such as the flange 414 of FIG. 4, which protrudes outside of the wheel hub, and/or use a tool to to pull the axle shaft in the outboard direction. A position of the shaft guide along an axle tube (e.g., the axle tube 206 of FIGS. 2 and 3), may be configured to enable disengagement of the axle shaft from the respective drivetrain or powertrain component, in addition to disconnection from the wheel hub. In other words, clearance is provided between the axle shaft and the differential or transmission as well as between the axle shaft and the wheel hub. By disengaging the axle shaft from the drivetrain/powertrain component, rotation of the axle shaft that may otherwise lead to degradation of the drivetrain components, such as instances where the operator is unaware that the drivetrain is in the tow mode and initiates rotation of the powertrain, may be mitigated.

When the radial nub is inserted into the inner radial groove, an interference fit between the radial nub and the inner radial groove may maintain an axial position of the axle shaft while a rigidity of the axle shaft may mitigate movement of the axle shaft in other directions. The axle shaft is thereby braced and supported by the shaft guide. In other examples, the drivetrain may already be adjusted to the tow mode and adjustment of the disengageable axle assembly (or assemblies) may not be demanded. The method returns to the start.

If operation of the vehicle drivetrain in the drive mode is desired, the method continues to 508 from 504 where the at least one disengageable axle assembly is adjusted to an unlocked position, as depicted in FIGS. 2 and 4. For example, the operator may push the axle shaft of the disengageable axle assembly in an inboard direction to release the radial nub of the axle shaft from the inner radial groove of the shaft guide. The operator may continue to push the axle shaft against a rigidity of the shaft guide until the radial nub is no longer enclosed within the shaft guide. The radial nub may be positioned inboard of the shaft guide and an inboard end of the axle shaft may be engaged with the drivetrain or powertrain component. The flange at the outboard end of the axle shaft may be in contact with the wheel hub, allowing the fasteners to be inserted and tightened to secure the flange to the wheel hub. Alternatively, the disengageable axle assembly may already be adjusted to the drive mode and therefore adjustment of the disengageable axle assembly (or assemblies) may not be demanded.

In this way, a drivetrain for a vehicle may be configured for flat-towing without demanding full uninstallation and removal of the vehicle axle shafts. In particular, for vehicles without a capability to adjust the vehicle transmission into a neutral mode, or during events where adjustment to the neutral mode is unavailable, the axle shafts may be disconnected from at least wheel hubs of the vehicle via disengageable axle assemblies but remain partially installed. For example, the axle shafts may remain aligned with the wheel hubs at an outboard end and a corresponding drivetrain or powertrain component at an inboard end while allowing the vehicle wheels to spin freely without compelling rotation of the vehicle powertrain. In some examples, the disengageable axle assemblies allows the axle shafts to also be disengaged from the powertrain of the vehicle. The disengageable axle assemblies may include a shaft guide, which may be used to initially guide insertion of the axle shafts during vehicle assembly, that has an inner radial groove. The inner radial groove may have a geometry that matches a geometry of a radial nub of the axle shafts. When the radial nub is mated with the radial groove, a resulting interference fit may maintain a position of the axle shaft aligned with the wheel hub and the drivetrain or powertrain component (but disconnected therefrom) while inhibiting movement of the axle shaft. The vehicle may thereby be readily prepared for flat towing without incurring additional costs, system complexity, or inconvenient removal and storage of the axle shafts.

FIGS. 2-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-4 are shown approximately to scale.

The disclosure also provides support for a drivetrain for a vehicle, comprising: an axle shaft having a radial nub protruding from an outer surface of the axle shaft, and a shaft guide circumferentially surrounding the axle shaft and having an inner radial groove configured to have an interference fit with the radial nub, wherein when the axle shaft is axially translated along an axial direction to engage the radial nub with the inner radial groove of the shaft guide, the axle shaft is disconnected from a wheel hub of the vehicle (e.g., the radial nub is engaged with the inner radial groove when the axle shaft is disconnected from the wheel hub and the axle shaft is translated along the axial direction). In a first example of the system, when the axle shaft is disconnected from the wheel hub, the axle shaft is also disengaged from a drivetrain component or a powertrain component, and wherein the axial direction is an outboard direction and axial translation of the axle shaft along the outboard direction to disconnect the axle shaft from the wheel hub is relative to a position of the axle shaft when the drivetrain is in a drive mode. In a second example of the system, optionally including the first example, the axle shaft is enclosed within an axle tube and the shaft guide is arranged between an inner surface of the axle tube and the outer surface of the axle shaft. In a third example of the system, optionally including one or both of the first and second examples, the shaft guide has a cylindrical portion and a flared portion, the cylindrical portion and the flared portion forming a continuous, single unit, and wherein the shaft guide is formed of a more flexible material than the axle shaft. In a fourth example of the system, optionally including one or more or each of the first through third examples, the cylindrical portion of the shaft guide is in face-sharing contact with an inner surface of an axle tube. In a fifth example of the system, optionally including one or more or each of the first through fourth examples, the flared portion circumferentially surrounds the axle shaft and an inner surface of the flared portion is spaced away and not in contact with the axle shaft. In a sixth example of the system, optionally including one or more or each of the first through fifth examples, the inner radial groove of the shaft guide is disposed along the inner surface of the flared portion of the shaft guide. In a seventh example of the system, optionally including one or more or each of the first through sixth examples, when the axle shaft is connected to the wheel hub, the radial nub of the axle shaft is positioned inboard of the shaft guide. In an eighth example of the system, optionally including one or more or each of the first through seventh examples, when the axle shaft is axially translated to engage the radial nub with the inner radial groove of the shaft guide, a clearance gap between the wheel hub and an outboard end of the axle shaft is formed.

The disclosure also provides support for a method for a disconnecting an axle shaft from a powertrain of a vehicle, comprising: axially translating the axle shaft in an outboard direction, the axle shaft circumferentially surrounded by a shaft guide having an inner radial groove, to engage a radial nub of the axle shaft with the inner radial groove of the shaft guide, wherein the axle shaft is disconnected from a wheel hub when the radial nub is disengaged from the inner radial groove (e.g., the method may include disconnecting the axle shaft from the wheel hub to facilitate the axial translation of the axle shaft). In a first example of the method, bolts securing the axle shaft to the wheel hub are removed prior to axially translating the axle shaft. In a second example of the method, optionally including the first example, the radial nub of the axle shaft presses against an inner surface of the shaft guide as the axle shaft is translated until the radial nub is inserted into the inner radial groove. In a third example of the method, optionally including one or both of the first and second examples, the axle shaft is axially translated in the outboard direction along a distance that disengages an inboard end of the axle shaft from a drivetrain or powertrain component. In a fourth example of the method, optionally including one or more or each of the first through third examples, when the radial nub of the axle shaft is engaged with the inner radial groove of the shaft guide, the wheel hub spins independent of the axle shaft. In a fifth example of the method, optionally including one or more or each of the first through fourth examples, the method further comprises: axially translating the axle shaft along an inboard direction, relative to a position of the axle shaft when the radial nub of the axle shaft is engaged with the inner radial groove of the shaft guide, to enable connection of the axle shaft to the wheel hub, and wherein the radial nub is positioned inboard of the shaft guide when the axle shaft is connected to the wheel hub.

The disclosure also provides support for a vehicle, comprising: an electric motor coupled to a drivetrain of the vehicle, the drivetrain including: an axle shaft having a radial nub, an axle tube enclosing the axle shaft, and a shaft guide arranged between an inner surface of the axle tube and an outer surface of the axle shaft and having an inner radial groove configured to receive the radial nub of the axle shaft, wherein a wheel hub of the vehicle spins independent of the electric motor when the radial nub of the axle shaft is inserted into the inner radial groove of the shaft guide. In a first example of the system, the shaft guide has a flanged portion including a sleeve and a cone, the cone including the inner radial groove, and wherein an inner diameter of the cone is greater than a diameter of the axle shaft. In a second example of the system, optionally including the first example, the cone is coupled to a cylindrical portion of the shaft guide at a region of the cone having a widest diameter of the cone, and wherein an outer diameter of the cylindrical portion is equal to an inner diameter of the axle tube. In a third example of the system, optionally including one or both of the first and second examples, when the axle shaft is connected to the wheel hub, the axle shaft rotates within the shaft guide without contacting the shaft guide. In a fourth example of the system, optionally including one or more or each of the first through third examples, the shaft guide is located proximate to an inboard end of the axle shaft and maintains a position of the inboard end of the axle shaft when the axle shaft is disconnected from the wheel hub.

In another representation, a drivetrain of a vehicle comprises a shaft guide formed of a deformable material, the shaft guide supporting an inboard end of an axle shaft when the axle shaft is disconnected from a differential or transmission of the vehicle. In a first example of the drivetrain, the shaft guide is in contact with the axle shaft only at a radial nub of the axle shaft when the radial nub is inserted into an inner radial groove of the shaft guide. A second example of the drivetrain optionally includes the first example, and further includes wherein the shaft is not in contact with the axle shaft when the axle shaft is disconnected from the differential or the transmission. A third example of the drivetrain optionally includes one or more of the first and second examples, and further includes wherein rotation at a wheel hub of the drivetrain, the wheel hub configured to be engaged with the axle shaft, is not transmitted to an electric motor of the vehicle when the radial nub of the axle shaft is inserted into the inner radial groove of the shaft guide.

In yet another representation, a method for flat towing a vehicle comprises disconnecting a wheel hub from an electric motor of the vehicle by axially translating an axle shaft coupled to the wheel hub until a radial nub of the axle shaft is inserted into an inner radial groove of a shaft guide.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A drivetrain for a vehicle, comprising:
   an axle shaft having a radial nub protruding from an outer surface of the axle shaft; and
   a shaft guide circumferentially surrounding the axle shaft and having an inner radial groove configured to have an interference fit with the radial nub,
   wherein when the axle shaft is axially translated along an axial direction to engage the radial nub with the inner radial groove of the shaft guide, the axle shaft is disconnected from a wheel hub of the vehicle.

2. The drivetrain of claim 1, wherein when the axle shaft is disconnected from the wheel hub, the axle shaft is also disengaged from a drivetrain component or a powertrain component, and wherein the axial direction is an outboard direction and axial translation of the axle shaft along the outboard direction to disconnect the axle shaft from the wheel hub is relative to a position of the axle shaft when the drivetrain is in a drive mode.

3. The drivetrain of claim 1, wherein the axle shaft is enclosed within an axle tube and the shaft guide is arranged between an inner surface of the axle tube and the outer surface of the axle shaft.

4. The drivetrain of claim 1, wherein the shaft guide has a cylindrical portion and a flared portion, the cylindrical portion and the flared portion forming a continuous, single unit, and wherein the shaft guide is formed of a more flexible material than the axle shaft.

5. The drivetrain of claim 4, wherein the cylindrical portion of the shaft guide is in face-sharing contact with an inner surface of an axle tube.

6. The drivetrain of claim 4, wherein the flared portion circumferentially surrounds the axle shaft and an inner surface of the flared portion is spaced away and not in contact with the axle shaft.

7. The drivetrain of claim 6, wherein the inner radial groove of the shaft guide is disposed along the inner surface of the flared portion of the shaft guide.

8. The drivetrain of claim 1, wherein when the axle shaft is connected to the wheel hub, the radial nub of the axle shaft is positioned inboard of the shaft guide.

9. The drivetrain of claim 1, wherein when the axle shaft is axially translated to engage the radial nub with the inner radial groove of the shaft guide, a clearance gap between the wheel hub and an outboard end of the axle shaft is formed.

10. A method for a disconnecting an axle shaft from a powertrain of a vehicle, comprising:
    axially translating the axle shaft in an outboard direction, the axle shaft circumferentially surrounded by a shaft guide having an inner radial groove, to engage a radial nub of the axle shaft with the inner radial groove of the shaft guide, wherein the axle shaft is disconnected from a wheel hub when the radial nub is engaged with the inner radial groove.

11. The method of claim 10, wherein bolts securing the axle shaft to the wheel hub are removed prior to axially translating the axle shaft.

12. The method of claim 10, wherein the radial nub of the axle shaft presses against an inner surface of the shaft guide as the axle shaft is translated until the radial nub is inserted into the inner radial groove.

13. The method of claim 10, wherein the axle shaft is axially translated in the outboard direction along a distance that disengages an inboard end of the axle shaft from a drivetrain or powertrain component.

14. The method of claim 10, wherein when the radial nub of the axle shaft is engaged with the inner radial groove of the shaft guide, the wheel hub spins independent of the axle shaft.

15. The method of claim 10, further comprising axially translating the axle shaft along an inboard direction, relative to a position of the axle shaft when the radial nub of the axle shaft is engaged with the inner radial groove of the shaft guide, to enable connection of the axle shaft to the wheel hub, and wherein the radial nub is positioned inboard of the shaft guide when the axle shaft is connected to the wheel hub.

16. A vehicle, comprising:
- an electric motor coupled to a drivetrain of the vehicle, the drivetrain including:
- an axle shaft having a radial nub;
- an axle tube enclosing the axle shaft; and
- a shaft guide arranged between an inner surface of the axle tube and an outer surface of the axle shaft and having an inner radial groove configured to receive the radial nub of the axle shaft,
- wherein a wheel hub of the vehicle spins independent of the electric motor when the radial nub of the axle shaft is inserted into the inner radial groove of the shaft guide.

17. The vehicle of claim 16, wherein the shaft guide has a flanged portion including a sleeve and a cone, the cone including the inner radial groove, and wherein an inner diameter of the cone is greater than a diameter of the axle shaft.

18. The vehicle of claim 17, wherein the cone is coupled to a cylindrical portion of the shaft guide at a region of the cone having a widest diameter of the cone, and wherein an outer diameter of the cylindrical portion is equal to an inner diameter of the axle tube.

19. The vehicle of claim 16, wherein when the axle shaft is connected to the wheel hub, the axle shaft rotates within the shaft guide without contacting the shaft guide.

20. The vehicle of claim 16, wherein the shaft guide is located proximate to an inboard end of the axle shaft and maintains a position of the inboard end of the axle shaft when the axle shaft is disconnected from the wheel hub.

\* \* \* \* \*